(No Model.)
W. G. ROTSELL.
NAILLESS HORSESHOE.
No. 594,561. Patented Nov. 30, 1897.
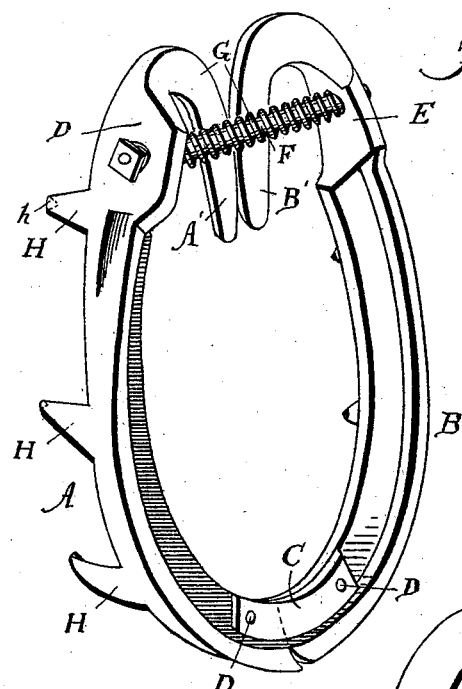
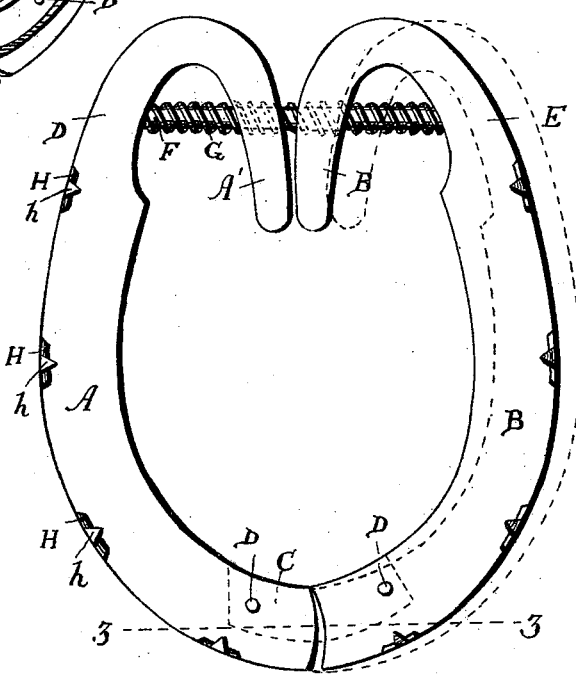
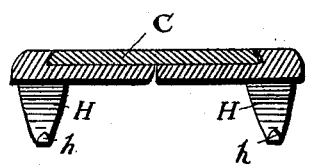
Witnesses.
E. S. Trull.
J. M. Pfeiffer
Wm. G. Rotsell, Inventor.
by Franklin H. Hough, Attorney.

UNITED STATES PATENT OFFICE.

WILLIAM G. ROTSELL, OF WARREN, PENNSYLVANIA.

NAILLESS HORSESHOE.

SPECIFICATION forming part of Letters Patent No. 594,561, dated November 30, 1897.

Application filed September 3, 1897. Serial No. 650,523. (No model.)

*To all whom it may concern:*

Be it known that I, WILLIAM G. ROTSELL, a citizen of the United States, residing at Warren, in the county of Warren and State of Pennsylvania, have invented certain new and useful Improvements in Horseshoes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in horseshoes; and it has more particular reference to that class of horseshoes which are designed to be attached to the hoof without the use of nails.

The object of the invention is to provide a simple and inexpensive shoe of the character described which may be quickly and easily secured to the hoof of a horse or removed therefrom by any person, thus obviating the necessity of employing a blacksmith. The shoe is of such construction as to permit of its being attached to the hoof in such a manner as to reduce the marking or disfigurement of the hoof to a minimum, and when attached will serve to effectually protect the frog of the hoof from injury, and the construction of the shoe is such as to permit of the yielding of the shoe within certain limits, thus preventing the shoe from breaking or being torn from the hoof by sudden contact with stones or other obstructions with which the shoe is at times brought into contact.

To this end and to such others as the invention may pertain the same consists in the novel construction of the shoe, all as more fully hereinafter described, shown in the accompanying drawings, and then specifically defined in the appended claims.

The invention is clearly illustrated in the accompanying drawings, which, with the letters of reference marked thereon, form a part of this specification, and in which drawings—

Figure 1 is a perspective view of a horseshoe embodying my invention, showing the under side of the shoe. Fig. 2 is a top plan view of the shoe. Fig. 3 is a section upon the line 3 3 of Fig. 2.

Reference now being had to the details of the drawings by letter, A and B represent two halves of the shoe, which are connected together at the toe of the shoe by a metallic strip C, the said strip being attached by rivets D D, the holes through which said rivets are passed being slightly larger than the diameters of the rivets, so as to permit the parts to swing outward, as indicated by dotted lines in Fig. 2 of the drawings.

The rear ends of the halves A and B of the shoe are curved inward and thence forward, thus forming the forwardly-extending parallel portions A' and B', for a purpose which will presently appear. At the rear ends of the sections A and B of the shoe are provided downwardly-extending ears D and E, through eyes or openings in which ears is passed a bolt F, upon the body of the bolt there being sleeved a coiled spring G, the ends of the spring bearing against the inner faces of the ears D and E, the tension of the spring serving to normally hold the sections of the shoe at the extreme outer ends of the bolt.

It will be observed that when the shoe is in place upon the hoof of a horse the frog of the hoof will be effectually protected from injury resulting from its contact with stones or other objects likely to effect an injury by means of the two parallel arms A' and B' of the shoe. These forwardly-extending arms A' and B' also serve an important office in preventing the bolt F from bending or breaking when brought into contact with stones or other obstructions, as a blow upon the bolt will serve to force it against the arms.

At intervals around the outer edge of the sections A and B of the shoe are provided vertical projections H, which at their upper ends are provided with inwardly-extending points *h*, which points are designed to engage the outer surface of the hoof to which the shoe is attached.

The method of applying the shoe to the hoof is as follows: The nut having been removed from the bolt, the sections A and B of the shoe are separated a sufficient distance to permit the shoe to be placed over the hoof.

A nut is then placed upon the end of the bolt, and by tightening the nut the sections of the shoe are drawn together at the heel, thus forcing the points $h$ into the hoof and holding the shoe against accidental displacement. When the nut has been tightened sufficiently to cause the points $h$ to securely engage the hoof, there will still be some play between the parallel arms A' and B'. It will thus be seen that a sufficient play or movement of the sections of the shoe is provided to permit the parts to yield in case of sudden shock and thus prevent breaking, which would otherwise result. The forwardly-extending arms A' and B' coming, as they do, directly beneath the frog will serve to effectually prevent the same from stone-bruising, and as these arms intervene between the hoof and the bolt connecting the rear ends of the shoe-sections they serve to prevent injury to the frog in the event of the bolt being bent upward when brought into contact with a stone or other hard substance.

Having thus described my invention, what I claim to be new, and desire to secure by Letters Patent, is—

1. A horseshoe, comprising two hinged sections having their rear ends curved inwardly to form parallel horizontal arms as described, in combination with a bolt connecting the rear ends of the sections, and a spring adapted to normally hold the rear ends of the sections at the outward limit of their movement, substantially as described.

2. In a horseshoe, two pivoted sections having at their rear ends inwardly and forwardly extending arms, a bolt passed through ears at the rear ends of the shoe-sections, and connecting the same at points below the forwardly-extending arms, and a coiled spring sleeved upon the bolt and bearing against the inner faces of the rear ends of the shoe-sections, substantially as described and for the purpose specified.

3. A horseshoe, comprising two hinged sections having inwardly-projecting points to engage the outer edge of the hoof, and at their rear ends provided with inwardly and forwardly extending arms as described, in combination with a bolt connecting the rear ends of the sections at points below the forwardly-extending arms, and a spring sleeved upon the bolt and having its ends bearing against the inner faces of the sections, substantially as described and for the purpose specified.

In testimony whereof I affix my signature in presence of two witnesses.

WILLIAM G. ROTSELL.

Witnesses:
J. M. DENTLES,
L. A. SIGGINS.